Patented Nov. 3, 1953

2,658,052

UNITED STATES PATENT OFFICE 2,658,052

MIXTURE OF POLYVINYLIDENE CHLORIDE, VINYL CHLORIDE POLYMER, AND BUTADIENE-ACRYLONITRILE COPOLYMER

Ralph J. Signer, Chicago, and Keith F. Beal, Park Forest, Ill., assignors to The Visking Corporation, Chicago, Ill., a corporation of Virginia No Drawing. Original application January 14, 1947, Serial No. 722,082. Divided and this application June 8, 1950, Serial No. 166,973

10 Claims. (Cl. 260—45.5)

This invention, which is a division of copending application Ser. No. 722,082, filed January 14, 1947, now U. S. Patent No. 2,547,605, relates to resinous composition and formed structures produced therefrom. More particularly, it relates to a new and improved synthetic resin composition and formed structures produced therefrom.

Many synthetic resins, such as, for example, vinylidene chloride-acrylonitrile copolymer, vinylidene chloride-vinyl chloride copolymer, polychloroprene, 1,3 butadiene-acrylonitrile copolymer, vinyl chloride-vinyl acetate copolymer, vinyl chloride-acrylonitrile copolymer, polyvinylidene chloride, etc. are currently and commercially available. A film produced from any of the aforementioned synthetic resins does not possess the necessary properties of flexibility, high resistance to tear, high elongation, capacity to return after elongation, high tensile strength, high resistance to moisture vapor penetration and to penetration by gases, as are required for the packaging of foodstuffs. Attempts were made to improve the physical properties of such films by the incorporation of a liquid plasticizer in the composition from which the films are produced. However, films containing a liquid plasticizer are unsatisfactory for the reason that such liquid plasticizers migrate from the resin or disappear by evaporation, leaving the resin embrittled, and frequently contaminate the contents of the package especially if the contents of the package is a foodstuff.

In the course of research to improve the properties of films produced from synthetic resins mentioned, attempts were made to prepare films of resinous compositions containing a plurality of synthetic resins. However, when attempts were made to form a resinous composition of polyvinylidene chloride and 1,3 butadiene-acrylonitrile copolymer it was found such resins were incompatible.

An object of this invention is to make a plurality of resins, which are normally incompatible in desired proportions, compatible.

Another object of this invention is to provide a resinous composition containing a plurality of resins normally incompatible in the desired proportions and a blending agent which will make such resins compatible.

An additional object of this invention is to provide formed structures formed of normally incompatible resins but which are compatible in the structure.

A further object of this invention is to provide resinous formed structures having improved physical properties.

A specific object of this invention is to provide films formed of resinous compositions having physical properties which render them suitable for use as a packaging material.

Other and additional objects will become apparent hereinafter.

The above objects are accomplished, in general, by incorporating in a resinous composition, containing a plurality of synthetic resins in proportions at which such resins are normally incompatible but which are necessary to obtain the desired properties, a blending agent whereby a homogeneous resinous composition is obtained from which the desired formed structure is prepared and in which structure the synthetic resins are compatible.

The blending agent, in general, is a synthetic resin as will hereinafter be more fully explained.

Usually, the synthetic resin components and the blending agent are dissolved in a solvent or solvent mixture whereby a homogeneous solution is obtained. Herein the term "solvent" covers a single solvent or a solvent mixture. No precise sequence for dissolving the resins and blending agent in the solvent is required. The resin components and blending agent can be added separately or simultaneously to the solvent. After the desired solution has been prepared, it is processed depending on the desired formed structure. In one embodiment of the invention, the resinous composition is formed into the desired formed structure and the solvent evaporated therefrom. In another embodiment, the resinous composition is extruded or cast into a precipitating bath, in which the resins are insoluble and with which the solvent is miscible, and thereafter the precipitated resinous article dried.

The nature of the invention will become more apparent by reference to the examples hereinafter set forth, wherein the proportions are by weight. It is to be understood that the examples are merely illustrative embodiments of the invention and that the scope of the invention is not restricted thereto. For convenience, the specific synthetic resins and specific blending agents of the examples are designated by their respective trade names, the identity of which is set forth in the following table:

TABLE I

| Trade-name | Made and sold by— | Approximate Composition |
|---|---|---|
| Hycar OR-15 | B. F. Goodrich Co. | 55% butadiene. 45% acrylonitrile. |
| Vinylite VYNS | Carbide & Carbon Chemical Corp. | 88% vinyl chloride. 12% vinyl acetate. |
| Geon 102 | B. F. Goodrich Co. | 100% vinyl chloride. |
| Vinylite CYCl | Carbide & Carbon Chemical Corp. | 65% vinyl chloride. 35% vinyl acetate. |

EXAMPLE 1

10 parts polyvinylidene chloride, 10 parts Vinylite VYNS, and 20 parts Hycar OR–15 were dissolved in 360 parts cyclohexanone. This solution was maintained at a temperature of 90°–100° C. and was cast as a thin film onto a glass plate prewarmed to 90° C. The plate and film were kept at 90°–100° C. until the solvent had been evaporated from the film. A strong, compatible film was thus obtained. Such film consisted of 25% polyvinylidene chloride, 25% Vinylite VYNS and 50% Hycar OR–15.

EXAMPLE 2

14 parts polyvinylidene chloride, 20 parts Hycar OR–15, and 6 parts Vinylite VYNS were dissolved in 360 parts cyclohexanone. This solution was maintained at a temperature of 90°–100° C. and was cast as a thin film onto a glass plate prewarmed to 90° C. The plate and film were kept at 90°–100° C. until the solvent had evaporated from the film. This film had a composition of 35% polyvinylidene chloride, 50% Hycar OR–15 and 15% Vinylite VYNS.

EXAMPLE 3

2.5 parts polyvinylidene chloride, 2.5 parts Vinylite CYCI, and 5 parts Hycar OR–15 were dissolved in 90 parts cyclohexanone. This solution was maintained at a temperature of 90°–100° C. and was cast as a thin film onto a glass plate prewarmed to 90° C. The plate and film were kept at 90°–100° C. until the solvent had been evaporated from the film. This film consisted of 25% polyvinylidene chloride, 25% Vinylite CYCI and 50% Hycar OR–15.

EXAMPLE 4

2.5 parts polyvinylidene chloride, 2.5 parts Geon 102, and 5 parts Hycar OR–15 were dissolved in 90 parts cyclohexanone. This solution was maintained at a temperature of 90°–100° C. and was cast as a thin film onto a glass plate prewarmed to 90° C. The plate and film were kept at 90°–100° C. until the solvent had been evaporated from the film. This film consisted of 25% polyvinylidene chloride, 25% Geon 102 and 50% Hycar OR–15.

The physical properties of films of Example 1 are given in the following Table II:

TABLE II

| Example | Physical properties of film | | | | | |
|---|---|---|---|---|---|---|
| | Tensile strength, lbs. per sq. in. | Elongation, per cent | Tear strength, grams per 1/1000" | Film thickness (mils) | Moisture vapor transmission [1] | Oxygen transmission [2] |
| 1 | 2,698 | 443 | 618 | 1.02 | 5.02 | 9.2 |

[1] Moisture vapor transmission—grams water per 24 hours per 100 square inches.
[2] Cubic centimeters gas per 24 hours per 100 square inches.

Testing methods used in determining values for Table II

*Tensile strength.*—Scott Inclined Plane Tensile Strength Tester. A sample 1 inch long by ¼ inch wide is used. Tensile strength as used in Table II is given in pounds per square inch based on original cross-section area of the sample.

*Elongation.*—Determined on same machine and sample as tensile strength.

*Tear strength.*—Thwing-Albert Research Type Tearing Tester. An initiated tear through a 1 inch length of film is used. Tear strength is recorded in grams per 1/1000 inch film thickness.

*Moisture vapor transmission.*—Determined by General Foods Method as described in "Modern Packaging," November 1942. Transmission given in grams of water passing through an area of 100 square inches of film in 24 hours.

*Oxygen transmission.*—Determined by method and apparatus described in "Paper Trade Journal" 118 No. 10, 32 (1944). Transmission recorded as cubic centimeters of gas passing through an area of 100 square inches of film in 24 hours.

No special method of preparing the solution of the synthetic resins and blending agent is necessary. The components can be added either separately or simultaneously to the selected solvent. The mass is preferably agitated until solution is complete. The solution can also be facilitated and hastened by the application of heat.

As shown by the examples, the solution can be extruded and the solvent evaporated therefrom, or the solution can be extruded into a bath which is a precipitating agent for the resins and preferably also is miscible with the solvent of the composition.

The solvents which can be employed in the production of shaped articles from the solution are not restricted to those of the examples. When, for example, an article is to be prepared by the process wherein the solvent is evaporated, any volatile solvent in which all of the resins are soluble can be used. When the article is to be prepared by a method wherein the solution is extruded into a precipitating bath, any solvent in which all the resins are soluble, and which preferably also is miscible with the precipitating bath, can be used. Generally, such solvent is volatile so that, upon drying of the article, the residual solvent will be evaporated.

In the embodiment of the invention wherein the solution is extruded into a precipitating bath, the latter is a liquid medium which precipitates the resin from the solution. The precipitating bath is also one which in admixture with the solvent will form a mixture which is a non-solvent for the resin. Though many liquid substances and solutions can be used as the precipitating bath, water is preferred because of its economy.

The total resin concentration in the solution is not restricted to those set forth in the examples. In general, when the solution is to be processed by a procedure wherein the solvent is evaporated from the shaped article, the total resin (including blending agent) can vary within limits. Usually, a total resin concentration of 10% to 30%, and preferably about 15%, is used. However, for that embodiment illustrated by Example 1, the resin content is preferably from 10% to 20%.

For wet casting operations, i. e. when the solution is extruded into a precipitating bath, a solution viscosity of 10 to 25 seconds by the falling ball method is desired (this represents the time required for a ⅛" steel ball to fall vertically through 8" of the resin solution). A solids content of approximately 15% to 25% is required to give such a viscosity.

Instead of blending through the use of solvents, the various latices can be mixed and thereafter coagulated and subsequently heated and/or milled.

The films produced by this invention are transparent and can be unvulcanized or vulcanized, as desired. In general, when a vulcanized film is desired, the composition can contain any filler, reinforcing pigment, age resistors, accelerators, and vulcanizing ingredients which are ordinarily used in vulcanizing rubber or synthetic rubber. When such a composition is used, the film, after or during drying, can be vulcanized in the known manner. By the appropriate selection of the vulcanizing agents, one or all of the vulcanizable constituents can be vulcanized to itself or to each other. Vulcanization of a specific constituent depends on the concentration of such ingredient and the use of the vulcanizing agent which will vulcanize only such ingredient.

Various other substances may be included in the formula, such as softening agents, plasticizers, etc., although in general these may not be desirable.

Furthermore, anti-blocking materials, such as paraffin, stearamide, natural waxes, synthetic waxes, stearic acid, cetyl acetamide, ethylene bis palmityl amide, dicetyl ether and their homologues, may be incorporated to improve the surface properties.

As shown by Examples 1-4 inclusive, polyvinylidene chloride and butadiene-acrylonitrile copolymer containing 45% acrylonitrile are made compatible by the use of a blending agent consisting of vinyl chloride previously polymerized alone or copolymerized with vinyl acetate to give a copolymer containing up to 35% vinyl acetate.

As shown in the examples, the proportion of the blending agent can vary. In general, the blending agent can be used in an amount of from 15% to 25% of the total resins.

As also shown by the examples, the proportions of the incompatible resins can also vary. In general, the blend can contain 25% to 35% vinylidene chloride and 50% to 40% butadiene-acrylonitrile copolymer.

This embodiment of the invention is not restricted to the solvents disclosed in Examples 1-4 inclusive. Any solvent possessing the characteristics hereinbefore described can be used. Cyclohexanone is the preferred solvent, though isophorone can be used.

Though the invention has been previously described particularly in connection with the production of film, it is to be understood that the invention is not restricted thereto. The solutions also can be used for the preparation of self-sustaining continuous film in the form of continuous seamless tubing. Likewise, the solutions hereinbefore described can be used in the production of other shaped structures, such as filaments, yarns, fibers, caps bands, etc. Additionally, the solutions can be employed as a coating composition for the coating of various base materials, such as paper, fabric, metal foil, regenerated cellulose, polyvinyl alcohol, nylon, zein, ethyl cellulose, cellulose acetate, etc. Still further, the solutions can be used as a sealing cement for gasproof seals of resinous sheet materials, as a cement for sealing films of polyvinylidene chloride and its copolymers, as a gasket cement, etc.

Self-sustaining film in the form of continuous sheeting or seamless tubing produced from the components of synthetic resins, herein described, are characterized by high resistance to moisture vapor penetration and to penetration by gases. Because of these properties, a film of the synthetic resins hereinbefore described is admirably suited for use in wrapping and packaging of any product which is desired to be protected.

In addition to the foregoing properties, a film of the synthetic resins hereinbefore described is transparent, thermoplastic, heat-sealable, resilient, has a high tensile strength, has a fair amount of elongation, is printable, contains no substance which will affect the odor and taste of the product wrapped therein or will migrate from the film into the product wrapped therein, resists exudation of fatty substances, and is highly resistant to puncture, all of which properties render the material particularly suitable for packaging or wrapping of foodstuffs.

Herein and in the claims the proportions are by weight unless otherwise specified.

In the claims, the term "consisting essentially of" is intended to cover the named ingredients with or without the modifying ingredients herein disclosed.

Since it is obvious that various changes and modifications may be made in the above description without departing from the nature or spirit thereof, this invention is not restricted thereto except as set forth in the appended claims.

We claim:

1. Formed structures consisting essentially of 25%-35% polyvinylidene chloride and 50%-40% of a rubbery copolymer of 55% butadiene and 45% acrylonitrile, said polyvinylidene chloride and butadiene-acrylonitrile copolymer being incompatible, and 15%-25% of a blending agent consisting of a vinyl polymer selected from the class consisting of polyvinyl chloride and a copolymer of vinyl chloride and up to 35% vinyl acetate whereby said incompatible polyvinylidene chloride and butadiene-acrylonitrile copolymer are made compatible.

2. Formed structures consisting essentially of 25%-35% polyvinylidene chloride and 50%-40% of a rubbery copolymer of 55% butadiene and 45% acrylonitrile, said polyvinylidene chloride and butadiene-acrylonitrile copolymer being incompatible, and 15%-25% of a blending agent consisting of polyvinyl chloride whereby said incompatible polyvinylidene chloride and butadiene-acrylonitrile copolymer are made compatible.

3. Formed structures consisting essentially of 25%-35% polyvinylidene chloride, 50%-40% of a rubbery copolymer of 55% butadiene and 45% acrylonitrile, and 15%-25% of a blending agent consisting of a copolymer of vinyl chloride and up to 35% vinyl acetate whereby said polyvinylidene and butadiene-acrylonitrile copolymer being normally incompatible are made compatible.

4. Self-sustaining film consisting essentially of 25%-35% polyvinylidene chloride and 50%-40% of a rubbery copolymer of 55% butadiene and 45% acrylonitrile, said polyvinylidene chloride and butadiene-acrylonitrile copolymer being incompatible, and 15%-25% of a blending agent consisting of a vinyl polymer selected from the class consisting of polyvinyl chloride and a copolymer of vinyl chloride and up to 35% vinyl acetate whereby said incompatible polyvinylidene chloride and butadiene-acrylonitrile copolymer are made compatible.

5. Self-sustaining film consisting essentially of 25%-35% polyvinylidene chloride and 50%-40% of a rubbery copolymer of 55% butadiene and 45% acrylonitrile, said polyvinylidene chloride and butadiene-acrylonitrile copolymer being incompatible, and 15%-25% of a blending agent consisting of polyvinyl chloride whereby said incompatible polyvinylidene chloride and butadiene-acrylonitrile copolymer are made compatible.

6. Self-sustaining film consisting essentially of 25%–35% polyvinylidene chloride, 50%–40% of a rubbery copolymer of 55% butadiene and 45% acrylonitrile, and 15%–25% of a blending agent consisting of a copolymer of vinyl chloride and up to 35% vinyl acetate whereby said polyvinylidene and butadiene-acrylonitrile copolymer being normally incompatible are made compatible.

7. Self-sustaining film consisting essentially of 25% polyvinylidene chloride and 50% of a rubbery copolymer of 55% butadiene and 45% acrylonitrile, said polyvinylidene chloride and copolymer being incompatible, and 25% of a blending agent consisting of a copolymer of vinyl chloride and 12% vinyl acetate whereby said polyvinylidene chloride and butadiene-acrylonitrile copolymer are made compatible.

8. Self-sustaining film consisting essentially of 35% polyvinylidene chloride and 50% of a rubbery copolymer of 55% butadiene and 45% acrylonitrile, said polyvinylidene chloride and copolymer being incompatible, and 15% of a blending agent consisting of a copolymer of vinyl chloride and 12% vinyl acetate whereby said polyvinylidene chloride and butadiene-acrylonitrile copolymer are made compatible.

9. Self-sustaining film consisting essentially of 25% polyvinylidene chloride and 50% of a rubbery copolymer of 55% butadiene and 45% acrylonitrile, said polyvinylidene chloride and copolymer being incompatible, and 25% of a blending agent consisting of a copolymer of vinyl chloride and 35% vinyl acetate whereby said polyvinylidene chloride and butadiene-acrylonitrile copolymer are made compatible.

10. Self-sustaining film consisting essentially of 25% of polyvinylidene chloride and 50% of a rubbery copolymer of 55% butadiene and 45% acrylonitrile, said polyvinylidene chloride and said copolymer being incompatible, and a blending agent consisting of 25% of polyvinyl chloride whereby said polyvinylidene chloride and butadiene-acrylonitrile copolymer are made compatible.

RALPH J. SIGNER.
KEITH F. BEAL.

References Cited in the file of this patent

UNITED STATES PATENTS

| Number | Name | Date |
|---|---|---|
| 2,247,154 | Geiger et al. | June 24, 1941 |
| 2,319,959 | Tierney | May 25, 1943 |
| 2,445,727 | Kinzinger | July 20, 1948 |
| 2,469,721 | Gidley | May 10, 1949 |
| 2,552,904 | Newberg et al. | May 15, 1951 |

FOREIGN PATENTS

| Number | Country | Date |
|---|---|---|
| 577,860 | Great Britain | June 4, 1946 |